March 18, 1941.  J. A. McGREW  2,235,233
LOCK WASHER
Filed July 15, 1940
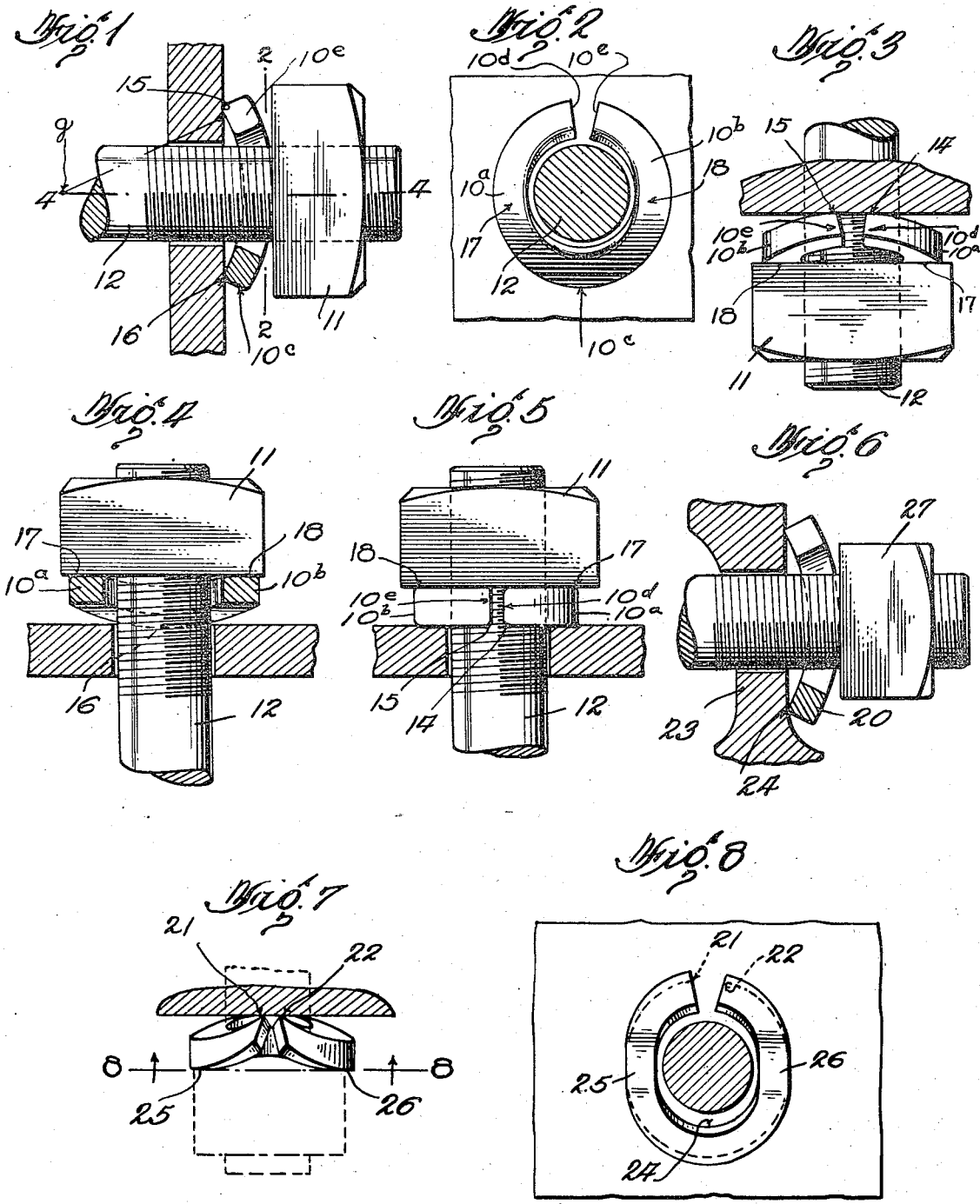
Inventor
John A. McGrew
By Watson, Cole, Grindle & Watson
Attorneys Patented Mar. 18, 1941

2,235,233

UNITED STATES PATENT OFFICE 2,235,233

LOCK WASHER

John A. McGrew, Albany, N. Y.

Application July 15, 1940, Serial No. 345,657

4 Claims. (Cl. 151—35)

The present invention relates to lock washers and its purpose is to provide a lock washer which shall be thoroughly effective when employed for the many purposes for which lock washers are commonly used but which at the same time shall be less costly to produce than lock washers of equal effectiveness heretofore designed or suggested.

The improved lock washer comprises a single spring metal member or element which is generally circular in form so that it may closely encircle a bolt and be engaged by a nut mounted on the bolt, being also so shaped as to include two similar deformable portions or arches each of which will be stressed and distorted when the nut is turned and the lock washer is loaded. The two arched portions are similarly curved about a common axis located to one side of the washer and are also curved in opposite directions about a second axis disposed normally to the first axis. Adjacent ends of the arched portion are formed integrally with one another and the other two ends are slightly spaced apart. As a result of this construction each of the arched portions is curved or arched from end to end and likewise the washer will have three points of contact with either of two parallel flat surfaces and two points of contact with the second of said surfaces so that, when the parallel surfaces are brought toward each other, the two arched portions of the washer are equally stressed or loaded. The washer may be substantially circular or somewhat oval-shaped but in every instance will comprise two continuously arched members two adjacent ends of which are integral and two are spaced apart, the washer being thus in the form of a discontinuous ring.

The washer may be formed so that it is reversible or non-reversible, that is, it may be so fabricated that one side must always be toward the nut and the other against the stationary member, or so fabricated that either side may be faced toward the nut and either side toward the stationary member. If desired, the washer may be provided with relatively sharp points with which to engage and cut into one of the members between which it is placed, so as to be non-rotatable with respect to such member. When intended to be reversible precaution is taken to make certain that the diameter of the washer is not so large that, when the concave side of the washer is toward the nut and the nut is turned, the edge of the nut, or corner thereof, can engage one of the free ends of the washer, which would result in distortion or spreading of the washer as the nut is turned down. It will be appreciated that for many uses it will be essential to have the washer reversible, particularly when quick application is vital, and that this will require that the points of contact between washer and nut, shall always lie within the projected area of the face of the nut. This is true, whether or not the ends of the washer have been rendered sharply pointed.

In the drawing:

Figure 1 shows portion of a bolt in side elevation, the bolt projecting through a member having a flat or plane surface and a nut being mounted on the bolt the inner face of which is parallel to the aforementioned surface, a lock washer of reversible type being interposed between the two parallel surfaces, the washer being seen in section, as along line 1—1 of Figure 2, and being under only light compression and practically undistorted;

Figure 2 is a section on line 2—2 of Figure 1;

Figure 3 is a view similar to Figure 1 but showing the washer in elevation and as it is seen from a point disposed 90° from the position from which it is seen in Figure 1;

Figure 4 is a section on line 4—4 of Figure 1;

Figure 5 is a view similar to Figure 3 but showing the washer fully loaded;

Figure 6 is a section similar to Figure 1 but showing a washer of the non-reversible type;

Figure 7 is an elevation of this washer and the associated nut and bolt, the pointed ends of the washer being shown in engagement with a stationary member but the washer being under very light compression only; and Figure 8 is a section on line 8—8 of Figure 7.

It will be observed in Figure 1 that the washer is arched from end to end and in reality it comprises two similarly arched portions 10a and 10b the two adjacent ends of which are integrally joined with each other and the opposite ends of which are spaced apart, the first mentioned ends meeting at the midsection 10c and the last mentioned ends being indicated at 10d and 10e, respectively. Each such member is continuously arched from end to end, however, and both have preferably the same cross-section. Conveniently the washer may be formed by first curving a length of rolled or drawn metal in a plane so as to form a flat member of annular or slightly oval shape, the two member portions 10a and 10b of the washer being curved in opposite directions about a central axis, or central axes, until the ends 10d and 10e lie in close proximity to each other, as shown. Thereafter the washer as an entirety is arched about an axis disposed normally to the first mentioned axis or to the plane of the first mentioned axes, so as to have concentric inner and outer surfaces centered on an axis located to one side of the washer and normal to the axis about which the portions 10a and 10b were previously curved. For instance, the washer shown is curved or arched about an axis passing through the point g (Figure 1) and disposed normally to the plane of the paper. For the sake of convenience in description, it may be said that the two portions 10a and 10b are oppositely curved about the axis of the bolt 12 or parallel axes spaced closely thereto, and are also arched about an axis intersecting the axis of the bolt 12 and disposed normally thereto.

The washer formed in the manner stated is adapted to bear at three points against one of two parallel flat surfaces, these points being indicated at 14, 15 and 16, and to bear at two points, 17 and 18, upon the other of the two parallel surfaces. It is true, of course, that the several contacts are not strictly point contacts, but that engagement is made, in each case, over a small but finite area, which will increase as the washer is flattened by the application of increased pressure. After placing of the washer in the position shown, or in the reverse position, nut 11 may be turned down as far as may be desired, the washer being gradually flattened as this is done. Because having three-point contact with one surface it is free to rock laterally as it is loaded and this ensures that the two arched members 10a and 10b will be equally stressed so that the forces applied by the nut upon opposite sides of the bolt, will exactly balance each other.

As compared with washers of the helical type, a washer of the kind just described has several important advantages. It is easier to handle and cannot become locked with other washers when placed in a container. All of the metal of the washer is usefully disposed, i. e., resists turning of the nut, and, as will be clear, it will offer a maximum resistance to compression for a given weight of metal employed, nearly twice as much resistance to loading or compression as the well-known helical type of washer, having two distortion-resisting portions instead of a single continuous portion. The same effect, therefore, can be obtained with approximately one-half of the amount of metal as can be obtained with a washer of the helical type. Preferably the washer is made slightly oval so that when it is arched the inner space for the reception of the bolt will be substantially circular, the washer therefore being so designed as to closely encircle the bolt with which it is to be used. In cross-section the member from which the washer is fabricated may be varied as desired.

It has of course been proposed, heretofore, to employ lock washers curved otherwise than in the conventional helical manner. Thus, previously known lock washers have been curved spherically, or in various generally spherical fashions. The lock washer of the present invention possesses an important advantage over the spherically curved type in that the latter makes contact, with at least one of the surfaces between which it is compressed, along a circle concentric with the bolt. The same circular contact areas of the respective surfaces are therefore constantly engaged, and no deformation of either surface need take place in effecting relative rotation therebetween. On the other hand, a reversible washer of the type described herein has a three-point contact with one of the adjacent surfaces, and a two-point contact with the opposite surface. Thus, in the case of relative rotation between the washer and either of the adjacent surfaces, the contact areas of the washer must successively engage new areas of such adjacent surface and, being under tension, necessarily must temporarily and successively deform such areas in order to effect such relative rotation. The gripping effect of the described reversible washer is therefore much greater than that of a spherically curved washer.

It is of course true that, where reversibility is not important, the washer may be elongated, as shown in Figures 6 and 7, its length being greater than the diameter of the nut with which it is used. While it may be that a washer of this type will, for certain purposes be preferred to one which is reversible, in the general case the reversible one will be preferred as this will function equally well, with the convex side outwardly or inwardly directed, thus facilitating rapidity of assembly.

The washer 20 of Figures 6, 7 and 8 is shown to have relatively sharp points 21 and 22 engaging the surface of member 23, a relatively sharp edge 24 engaging this member, and makes line contact at 25 and 26 with the undersurface of a nut such as 27, at least prior to the time that the nut is fully turned down or tightened. Three-point contact with one member and two-point contact with the other is still obtained, with the resultant advantages, and the washer is practically twice as strong for a given weight of metal, as the helical washer. It will be appreciated that minor variations of the two types of washers shown come within the scope of the invention.

In the appended claims, where it is stated that the washer is adapted to have point contact with a nut or other member, it is meant that such contact may be either over a minor area, or over a larger area, or along a line, except where it is specifically stated that the points are sharp points or that the contact is line contact.

Having thus described the invention, what is claimed as new and desired to be secured by Letters Patent is:

1. A spring washer comprising a spring metal member having an aperture for the reception of a bolt or the like, said member having substantially cylindrical convex and concave surfaces, said concave surface having three spaced points adapted to engage a flat surface, two of said points being relatively sharp, and said convex surface being adapted to effect line contact with another flat surface when said washer is partially compressed between said flat surfaces.

2. A spring washer as set forth in claim 1, said spring metal member having the form of a discontinuous loop the free ends of which are spaced apart.

3. A reversible spring washer comprising two similar deformable portions circularly curved about an axis and arranged in end-to-end relationship, two adjacent ends of said portions being free or independent of each other and separated by a narrow gap and the other two ends merging at a junction point midway between said free ends so that the two curved portions together form a one-piece nearly continuous ring-like member adapted to closely encircle a bolt, each such portion being also curved or arched from its free end to its merged end about an axis spaced laterally of the washer, and which passes through or near said first mentioned axis, said last mentioned axis being substantially normal to a plane which includes the first mentioned axis and passes through the gap between the free ends of said deformable portions, whereby the free end and merged end of each deformable portion of said washer will contact with one of two parallel surfaces and a point on each deformable portion intermediate its free and merged ends will contact with the second of such parallel surfaces when the washer is partially loaded, the washer thus being constructed to have three points of contact with either of two members to be locked against relative rotation about said first mentioned axis, and two points of contact with the second of such members.

4. A reversible spring washer comprising two similar deformable portions circularly curved about an axis and arranged in end-to-end relationship, two adjacent ends of said portions being free or independent of each other and separated by a narrow gap and the other two ends merging at a junction point midway between said free ends so that the two curved portions together form a one-piece nearly continuous ring-like member adapted to closely encircle a bolt, both such portions being also curved or arched continuously from their free ends to their merged ends about a common axis spaced laterally of the washer, which axis passes through or near said first mentioned axis and is substantially normal to a plane which includes the first mentioned axis and passes through the gap between the free ends of said deformable portions, whereby the free end and merged end of each deformable portion of said washer may contact with one of two parallel surfaces and a point on each deformable portion midway between its free and merged ends will contact with the second of such parallel surfaces when the washer is partially loaded, the washer thus being constructed to have three points of contact with either of two members to be locked against relative rotation about said first mentioned axis, and two points of contact with the second of such members.

JOHN A. McGREW.